United States Patent
Chamaret et al.

(10) Patent No.: US 10,013,745 B2
(45) Date of Patent: Jul. 3, 2018

(54) METHOD FOR INVERSE TONE MAPPING OF A SEQUENCE OF IMAGES

(71) Applicant: THOMSON LICENSING, Issy les Moulineaux (FR)

(72) Inventors: Christel Chamaret, Chantepie (FR); Laurent Cauvin, Chevaigne (FR); Ronan Boitard, Belz (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/246,273

(22) Filed: Aug. 24, 2016

(65) Prior Publication Data

US 2017/0061590 A1    Mar. 2, 2017

(30) Foreign Application Priority Data

Aug. 25, 2015 (EP) .................................... 15306308

(51) Int. Cl.
*G06K 9/00* (2006.01)
*G06T 5/00* (2006.01)
(Continued)

(52) U.S. Cl.
CPC .............. *G06T 5/007* (2013.01); *G06T 5/009* (2013.01); *G06T 5/20* (2013.01); *H04N 21/4318* (2013.01);
(Continued)

(58) Field of Classification Search
CPC ...... H04N 19/186; H04N 19/36; H04N 19/33; H04N 19/34; H04N 19/80; H04N 11/002; G06T 2207/20208; G06T 5/007

See application file for complete search history.

(56) References Cited

U.S. PATENT DOCUMENTS

| | | | | |
|---|---|---|---|---|
| 2009/0027558 A1* | 1/2009 | Mantiuk | .............. | H04N 1/6027 348/673 |
| 2011/0194618 A1* | 8/2011 | Gish | ......................... | G06T 5/50 375/240.25 |
| 2014/0003528 A1* | 1/2014 | Tourapis | ................ | H04N 19/30 375/240.16 |

FOREIGN PATENT DOCUMENTS

| EP | 1732330 | 12/2006 |
|---|---|---|
| WO | WO2014187808 | 11/2014 |
| WO | WO2015096955 | 7/2015 |

OTHER PUBLICATIONS

Kuo et al., "Content-Adaptive Inverse Tone Mapping", IEEE Conference on Visual Communications and Image Processing, San Diego, California, USA, Nov. 27, 2012, pp. 1-6.

(Continued)

*Primary Examiner* — Eueng-Nan Yeh
(74) *Attorney, Agent, or Firm* — Brian J. Dorini; Jeffrey M. Navon

(57) ABSTRACT

A method is described for inverse tone mapping the luminance ($Y_t(p)$) of each pixel (p) of at least one image ($I_t$) of this sequence into an expanded luminance $Y_t^{exp}(p)=Y_t(p)^{E_t(p)} \cdot Y_t^{enh}(p)$, wherein $E_t(p)$ is an expansion exponent value extracted from an expansion exponent map built from low pass motion-compensated temporal filtering of said image ($I_t$) and wherein $Y_t^{enh}(p)$ is a luminance-enhancement value extracted from a luminance-enhancement map built from high pass motion-compensated temporal filtering of said image ($I_t$).

18 Claims, 4 Drawing Sheets

(51) Int. Cl.
    *H04N 21/431*     (2011.01)
    *G06T 5/20*     (2006.01)
    *H04N 19/615*     (2014.01)

(52) U.S. Cl.
    CPC ............... *G06T 2207/10016* (2013.01); *G06T 2207/10024* (2013.01); *G06T 2207/20064* (2013.01); *G06T 2207/20208* (2013.01); *H04N 19/615* (2014.11)

(56) References Cited

OTHER PUBLICATIONS

Banterle et al., "Inverse Tone Mapping", 4th International Conference on Computer Graphics and Interactive Techniques in Australasia and Southeast Asia, Kuala Lumpur, Malaysia, Nov. 29, 2006, pp. 349-356.

Banterle et al,. "A Psychophysical Evaluation of Inverse Tone Mapping Techniques", Computer Graphics Forum, vol. 28, No. 1, Mar. 2009, pp. 13-25.

Didyk et al., "Enhancement of Bright Video Features for HDR Displays", Proceedings of the Nineteenth Eurographics Symposium on Rendering, vol. 27, No. 4, Jun. 2008, pp. 1265-1274.

Masia et al., "Evaluation of Reverse Tone Mapping Through Varying Exposure Conditions", ACM Transactions on Graphics (TOG), vol. 28, No. 5, Article No. 160, Dec. 2009, pp. 1-8.

Meylan et al., "Tone Mapping for High Dynamic Range Displays", Proceedings of IS&T/SPIE Electronic Imaging: Human Vision and Electronic Imaging XII, vol. 6492, Feb. 12, 2007, pp. 1-12.

Rempel et al., "Ldr2Hdr: On-the-fly Reverse Tone Mapping of Legacy Video and Photographs", ACM Transactions on Graphics (TOG), vol. 26, No. 3, Article No. 39, Jul. 2007, pp. 1-6.

Akyuz et al., "Do HDR displays support LDR content? A Psychophysical Evaluation", ACM 34th International Conference and Exhibition on Computer Graphics and Interactive Techniques, Article No. 38, San Diego, California, USA, Aug. 5, 2007, pp. 1-7.

Kovaleski et al., "High-quality brightness enhancement functions for real-time reverse tone mapping", The Visual Computer: International Journal of Computer Graphics, vol. 25, No. 5, Mar. 11, 2009, pp. 539-547.

Turaga et al., "Unconstrained Motion Compensated Temporal Filtering (UMCTF) for Efficient and Flexible Interframe Wavelet Video Coding", Signal processing: Image communication, vol. 20, No. 1, 2005, pp. 1-19, (published before this application Aug. 2016).

Pearlman et al., "Embedded Video Subband Coding with 3D SPIHT", Wavelet Image and Video Compression, Part IV, vol. 450 in the series The International Series in Engineering and Computer Science, Springer, New York, 2002, pp. 397-432, (published before this application Aug. 2016).

* cited by examiner

METHOD FOR INVERSE TONE MAPPING OF A SEQUENCE OF IMAGES

This application claims the benefit, under 35 U.S.C. § 119 of European Patent Application No. 15306308.6, filed Aug. 25, 2015.

TECHNICAL FIELD

The invention pertains to the field of high dynamic range imaging and addresses notably the problem of expanding the dynamic range of low dynamic range content to prepare such content for display devices having notably high peak luminance.

BACKGROUND ART

Recent advancements in display technology are beginning to allow for an extended range of color, luminance and contrast to be displayed.

Technologies allowing for extensions in luminance or brightness range of image content are known as high dynamic range imaging (HDR). HDR technologies focus on capturing, processing and displaying content of a wider dynamic range.

Although a number of HDR display devices have appeared, and image cameras capable of capturing images with an increased dynamic range are being developed, there is still very limited HDR content available. While recent developments promise native capture of HDR content in the near future, they do not address existing content.

To prepare conventional (hereon referred to as LDR for low dynamic range) content for HDR display devices, reverse or inverse tone mapping operators (iTMO) can be employed. Such algorithms process at least the luminance information of colors in the image content with the aim of better recovering or recreating the original scene. Typically, iTMOs take a conventional (i.e. LDR) image as input, at least expand the luminance range of the colors of this image in a global manner, and subsequently process highlights or bright regions locally to enhance the HDR appearance of colors in the image.

Typically, HDR imaging is defined by an extension in dynamic range between dark and bright values of luminance of colors combined with an increase in the number of quantization steps. To achieve more extreme increases in dynamic range, many methods combine a global expansion with local processing steps that enhance the appearance of highlights and other bright regions of images.

To enhance bright local features in an image, it is known to create a luminance expansion map, such that each pixel of the image can be associated with an expansion value to apply to the luminance of this pixel. In the simplest case, clipped regions in the image can be detected and then expanded using a steeper expansion curve, however such a solution does not offer sufficient control over the appearance of the image.

When dealing with sequence of images, prior art mostly referring to Inverse Tone Mapping does not generally take into account the temporal aspect. Sequences of images can be processed on a frame basis with different strategies:
- Combination of local and global expansion of luminance range following different functions: inverse sigmoid, linear or piecewise linear.
- Spatial expansion of luminance range on a pixel basis, relying on a spatial filtered version of the original LDR frame. This spatial filtered version may be a low pass version of bright areas of the LDR image. Edges can be preserved in this filtered version to ensure consistent luminance expansion.

Concerning temporal artefacts or issues, methods that are disclosed in Prior Art do not really apply a processing for ensuring a temporal stability, but rather follow original luminance variation (locally and globally) that intrinsically induces a temporal stability in the expansion, but do not guarantee it.

There is a need for a novel iTMO, which aims to enhance the temporal stability and the temporal consistency of inverse tone mapped sequences of images.

SUMMARY OF INVENTION

It is an object of the invention to enhance the visual appeal of images of a sequence by selectively and dynamically remapping the luminance of pixels of these pixels. Basically, it is considered that different luminance processing is necessary for different parts of the image, notably depending on the level of details contained in these different parts. Therefore, in the method of inverse tone mapping of images of a sequence as proposed below, the range of luminance expansion is spatially varying and therefore completely adapted to the image content.

A subject of the invention is therefore a method for inverse tone mapping at least one original current image of a sequence of images, the colors of which are represented in a color space separating luminance from chrominance, comprising:
- building a expansion exponent map from low pass motion-compensated temporal filtering of said original current image,
- building a luminance-enhancement map from high pass motion-compensated temporal filtering of said original current image,
- inverse tone mapping the luminance of each pixel of said original current image into an expanded luminance obtained through the product of the luminance of said pixel at the power of an expansion exponent value obtained for the corresponding pixel in said expansion exponent map and of a luminance-enhancement value obtained for the corresponding pixel in said luminance-enhancement map, then resulting in a corresponding expanded current image.

Such motion-compensated temporal filtering operations are different from the spatial filtering operations disclosed in WO2015/096955. This difference is detailed in the embodiment below.

If $Y_t(p)$ is the luminance of this pixel in the original current image, if $E_t(p)$ is the expansion exponent value and if $Y_t^{enh}(p)$ is the luminance-enhancement value, it means that the expanded luminance $Y_t^{exp}(p) = Y_t(p)^{E_t(p)} \cdot Y_t^{enh}(p)$.

As the expansion exponent value that is used for the expansion is specific to each pixel of the image to expand, it means that each pixel will get its own expansion. Therefore, the expansion of luminance range obtained by this method is spatially varying and adapted to the image content.

Because the enhancement of luminance is provided through high pass temporal filtering, it will be advantageously adapted to compensate at least partially for the smoothing of details of the image due to the low pass temporal filtering used to build the expansion exponent map.

Preferably, the method for inverse tone mapping also comprises enhancing saturation of colors of said at least one original current image by multiplying chroma of each pixel of said image by an expansion exponent value obtained for this pixel in said expansion exponent map.

Preferably, high pass motion-compensated temporal filtering of said original current image is obtained by a temporal decomposition of said original current image into at least one temporal high frequency band using a wavelet filtering along a temporal axis, and said low pass motion-compensated temporal filtering of said original current image is obtained by the same temporal decomposition of said current image into at least one temporal low frequency band using the same wavelet filtering along the temporal axis.

Wavelet filtering along the temporal axis is known in the art of wavelet coding, as performing motion compensated temporal filtering ("MCTF"). See for instance the article "Unconstrained Motion Compensated Temporal Filtering (UMCTF) for Efficient and Flexible Interframe Wavelet Video Coding", by D. S. Turaga et al., published in 2005 in Signal processing—Image communication, vol. 20, no1, pp. 1-19. See also "Embedded Video Subband Coding with 3D SPIHT", by William A. Pearlman et al., published in 2002 in Volume 450 of the series *The International Series in Engineering and Computer Science*, pp 397-432.

Such a wavelet filtering along a temporal axis is different from the spatial wavelet filtering disclosed in WO2015/096955.

Preferably, said high pass motion-compensated temporal filtering of said original current image is obtained by comparing said original current image with an original preceding image in said sequence which is backward motion compensated.

Preferably, said comparison is obtained by a difference, pixel by pixel, between said original current image and said backward motion-compensated preceding image.

Preferably, for backward motion compensation of each pixel of said preceding image, a backward motion vector of said pixel is used.

Preferably, said low pass motion-compensated temporal filtering of said original current image is obtained:
 by high pass motion-compensated temporal filtering of an original following image in said sequence, resulting in a high pass motion-compensated temporal filtered following image,
 then by comparing said original current image with said high pass motion-compensated temporal filtering following image which is forward motion-compensated.

Preferably, said comparison is obtained by a difference, pixel by pixel, between said current image and said forward motion-compensated image.

Preferably, for forward motion compensation of each pixel of said image, a forward motion vector of said pixel is used.

Preferably, said building of an expansion exponent map takes into account a value of peak luminance of a display device adapted to reproduce said expanded current image.

Preferably, said building of an expansion exponent map takes into account this value of peak luminance such that the maximum luminance over pixels of said image at the power of the pixel expansion exponent value obtained for the pixel of this image having this maximum luminance is equal to said peak luminance.

Preferably, said building of an expansion exponent map comprises reshaping said low pass motion-compensated temporal filtering of said current image such that values of expanded luminance of said expanded current image that are obtained are redistributed such that the mean expanded luminance of said expanded current image is approximately equal to the mean luminance of said current image.

Preferably, said building of a luminance-enhancement map comprises renormalizing luminances of high pass temporal filtered current image obtained from said high pass motion-compensated temporal filtering of said current image between a minimum value and a maximum value of luminance over all pixels of the high pass temporal filtered current image.

A subject of the invention is also an image processing device for inverse tone mapping at least one original current image of a sequence of original images, the colors of which are represented in a color space separating luminance from chrominance, comprising:
 a high pass temporal filtering module configured to filter said original current image into a high pass motion-compensated temporal filtered image,
 a low pass temporal filtering module configured to filter said original current image into a low pass motion-compensated temporal filtered image,
 an expansion exponent map building module configured to build an expansion exponent map from a low pass temporal filtered current image obtained from said low pass temporal filtering module,
 a luminance-enhancement map building module configured to build a luminance-enhancement map from a high pass temporal filtered current image obtained from said high pass temporal filtering module,
 an inverse tone mapping module configured to inverse tone map the luminance of each pixel of said original current image into an expanded luminance obtained through the product of the luminance of said pixel at the power of the pixel expansion exponent value obtained for the corresponding pixel in an expansion exponent map provided by said expansion exponent map building module and of the luminance-enhancement value obtained for the corresponding pixel in a luminance-enhancement map provided by said luminance-enhancement map building module.

Preferably, the image processing device comprises an enhancement saturation module configured to enhance saturation of colors of said at least one original current image by multiplying chroma of each pixel of said image by the expansion exponent value obtained for this pixel in the expansion exponent map provided by said expansion exponent map building module.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The functions of the various elements shown in the figures may be provided through the use of dedicated hardware as well as hardware capable of executing software in association with appropriate software.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The invention may be notably implemented as a combination of hardware and software. Moreover, the software may be implemented as an application program tangibly embodied on a program storage unit. Such software can take the form of a plug-in to be integrated to another software. The application program may be uploaded to, and executed by, an image processing device 1 comprising any suitable architecture. Preferably, the image processing device is implemented on a computer platform having hardware such as one or more central processing units ("CPU"), a random access memory ("RAM"), and input/output ("I/O") interfaces. An output may be connected to a display device having HDR capabilities. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, a printing unit, . . . . The image processing device implementing the embodiment of the method according to the invention may be part of any electronic device able to receive images, for instance a TV set, a set-top-box, a gateway, a cell phone, a tablet.

Figure 1:
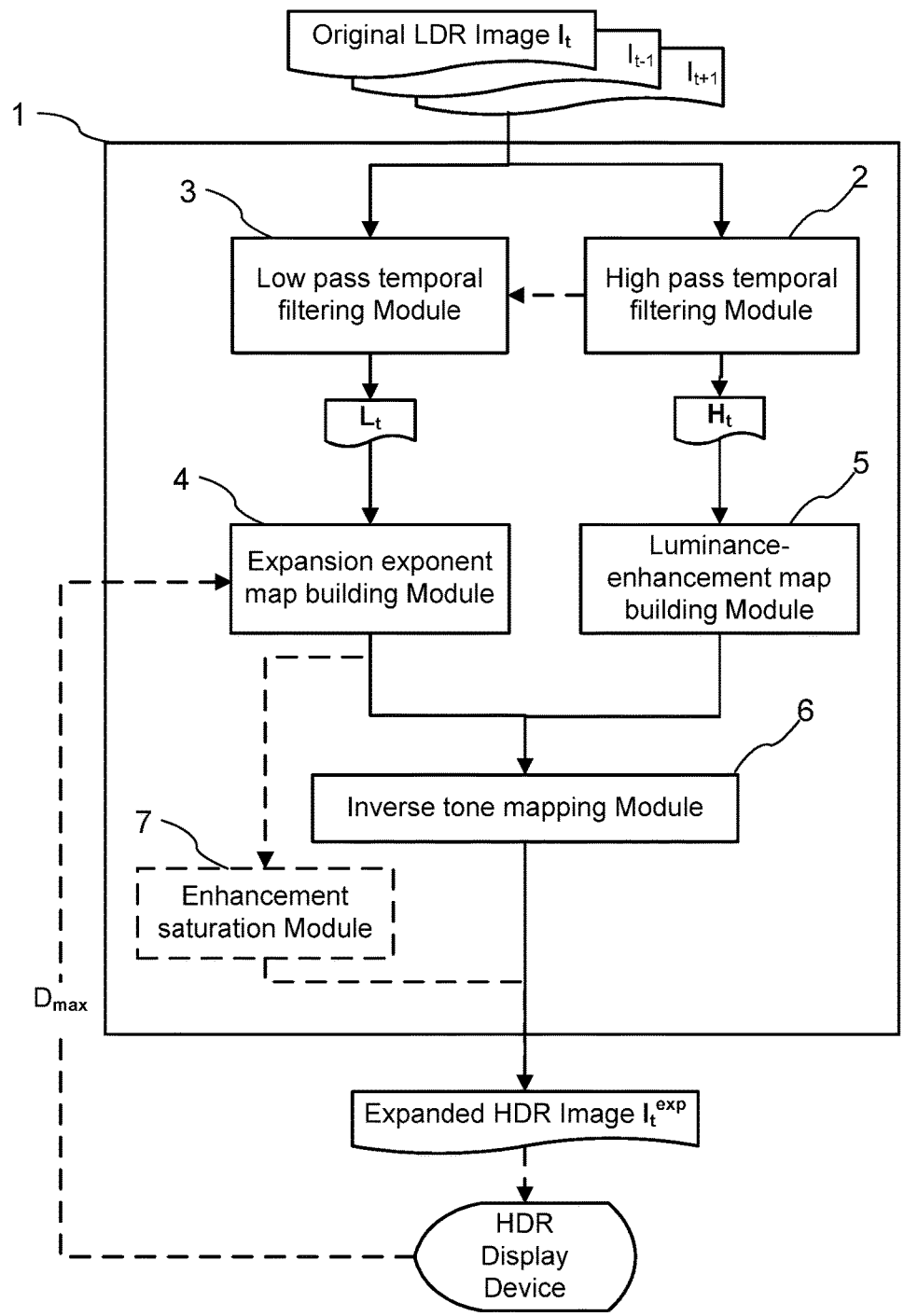
FIG. 1 illustrates an image processing device used to embody the inverse tone-mapping process shown on FIG. 2.

This image processing device 1 for the inverse tone mapping of an image, the colors of which are represented in a color space separating luminance from chrominance, comprises, in reference to FIG. 1:
- a high pass temporal filtering module 2 configured to filter an original image into a high pass motion-compensated temporal filtered image $H_t$,
- a low pass temporal filtering module 3 configured to filter an original image into a low pass motion-compensated temporal filtered image $L_t$,
- an expansion exponent map building module 4 configured to build an expansion exponent map from a low pass motion-compensated temporal filtered image $L_t$ obtained from the low pass temporal filtering module,
- a luminance-enhancement map building module 5 configured to build a luminance-enhancement map from a high pass motion-compensated temporal filtered image $H_t$ obtained from the high pass temporal filtering module,
- an inverse tone mapping module 6 configured for inverse tone map the luminance of each pixel of the original image into an expanded luminance obtained through the product of the luminance of this pixel at the power of the pixel expansion exponent value obtained for the corresponding pixel in an expansion exponent map provided by the expansion exponent map building module 4 and of the luminance-enhancement value obtained for the corresponding pixel in a luminance-enhancement map provided by the luminance-enhancement map building module 5,
- optionally, an enhancement saturation module 7 configured to enhance saturation of colors of the original image by multiplying chroma of each pixel of this image by the expansion exponent value obtained for this pixel in the expansion exponent map provided by the expansion exponent map building module 4.

Figure 2:
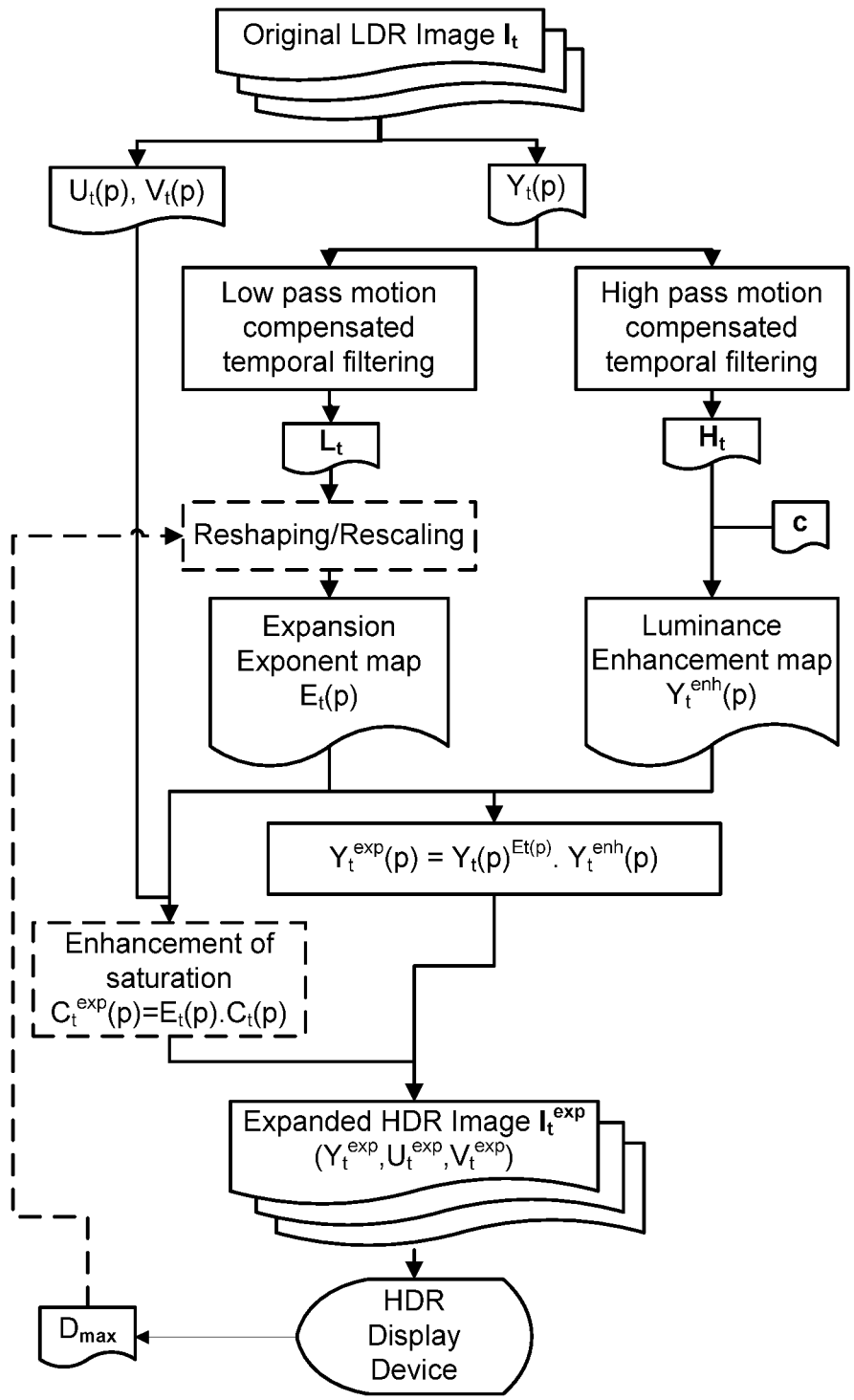
FIG. 2 illustrates the main steps of a main embodiment of the inverse tone-mapping process according to the invention.

A main embodiment of the method for the inverse tone mapping of a sequence of images will now be described in reference to FIGS. 2 and 3, using the image processing device as described above.

A sequence of original LDR images is inputted in the image processing device. This sequence comprises an original current image $I_t$ temporally located in this sequence between an original preceding image $I_{t-1}$ and an original following image $I_{t+1}$. It means that all data related to colors and positions of each pixel of these original images are inputted. As inputted, the color of each pixel of these images is generally encoded into three color coordinates, i.e. one color coordinate for each color channel, R, G and B.

In a first preliminary step of this embodiment (not shown on FIG. 2), the received RGB color coordinates of these colors are, if needed, normalized and optionally linearized in a manner known per se, such that the colors of the received images are represented in the RGB color space of a display device. This RGB color space can be standardized, and then the corresponding display device is a virtual one. Then, the RGB color coordinates representing these colors is this RGB color space are converted into color coordinates representing the same colors but in a color space separating luminance from chrominance, for instance the YUV color space. This conversion of colors from the RGB color space into the YUV color space is known per se and therefore not described in detail. Any other color space separating luminance from chrominance can be used instead, as XYZ, Yxy, CIE Lab. Therefore, as for any original image of the inputted LDR sequence, a luminance value $Y_t(n)$ and two chrominance values $U_t(n)$, $V_t(n)$ are associated with the color of any pixel n of this original image $I_t$. An aim of the embodiment of the method of inverse tone mapping that will be described is to expand these luminance values $Y_t(n)$ into expanded luminance values by applying an expansion exponent value $E_t(n)$ to each of these luminance values $Y_t(n)$.

In a second preliminary step of this embodiment (not shown on FIG. 2), a backward motion vector field and a backward motion vector field are obtained in a manner known per se. The backward motion vector field allows to motion compensate the preceding original image $I_{t-1}$ in order to get a backward motion compensated current image $BMC(I_{t-1})$ that can be compared to the current image $I_t$, and the forward motion vector field allows to motion compensate the following original image $I_{t+1}$ in order to get a forward motion compensated current image $FMC(I_{t-1})$ that can be compared to a current image $I_t$. A backward motion vector $v_b$ and a forward motion vector $v_f$ can be associated to each pixel n of the current original image $I_t$.

Using the high pass temporal filtering module, high temporal frequencies of the current image $I_t$ are obtained in a third step by comparing this current original image $I_t$ with the preceding image $I_{t-1}$ which is backward motion compensated using, for each pixel of this current original image, the backward motion vector $v_b$ of this pixel obtained through the second preliminary step above. It means that $I_t$ is compared with the Backward Motion-Compensated image $BMC(I_{t-1})$. As depicted on FIG. 3, the result of this comparison is a high pass temporal filtered current image $H_t$.

More precisely, the luminance $H_t(n)$ of each pixel n of this high pass temporal filtered current image $H_t$ is calculated as follows in reference to the luminance $Y_t(n)$ of the pixel n in the current image $I_t$ and to the luminance $Y_{t-1}(n+v_b)$ of the corresponding pixel $n+v_b$ in the preceding image $I_{t-1}$:

$$H_t(n) = \frac{Y_t(n) - Y_{t-1}(n + v_b)}{2}$$

Globally, this third step corresponds to a high pass motion-compensated temporal filtering of the current image $I_t$. This step is different from the extraction of high frequencies in a spatial neighborhood of the pixel as disclosed in WO2015/096955, because such an extraction corresponds to a high pass spatial filtering, instead of a temporal filtering.

Figure 4:
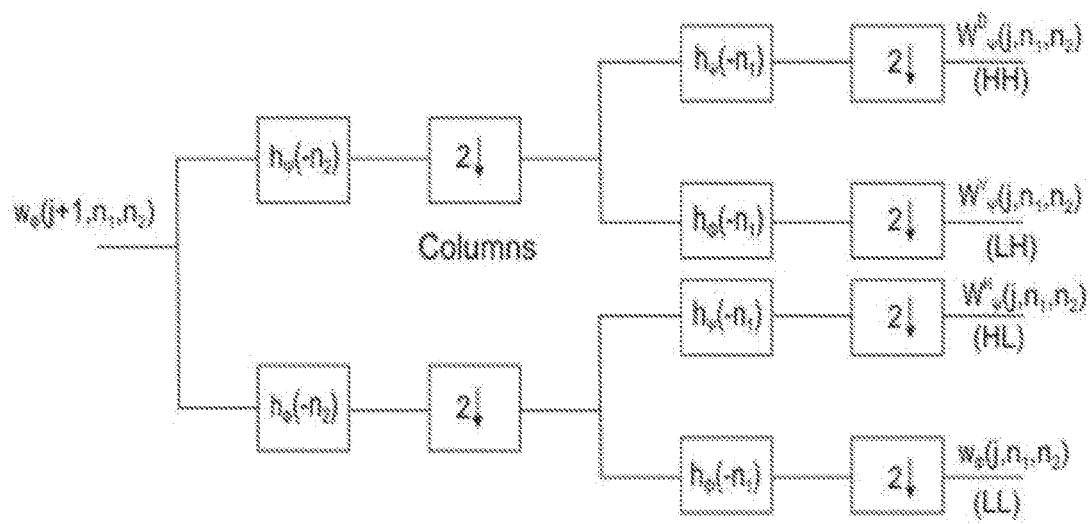
FIG. 4 illustrates a wavelet decomposition along a temporal axis j, j+1 of the YUV coordinates of colors of an image to be inverse-tone mapped.

Other way of high pass motion-compensated temporal filtering can be used instead. For instance, luminance $Y_t(n)$ of colors may be encoded into increasing levels of wavelet decomposition along a temporal axis, each level having at least a high-frequency coefficient LH and a low-frequency coefficient LL, as described for instance at FIG. 4 in which indexes j, j+1 correspond to the temporal axis. In such a situation, the high pass temporal filtered current image $H_t$ will correspond to a high frequency subband of the wavelet decomposition of the current image $I_t$ along a temporal axis.

Figure 3:
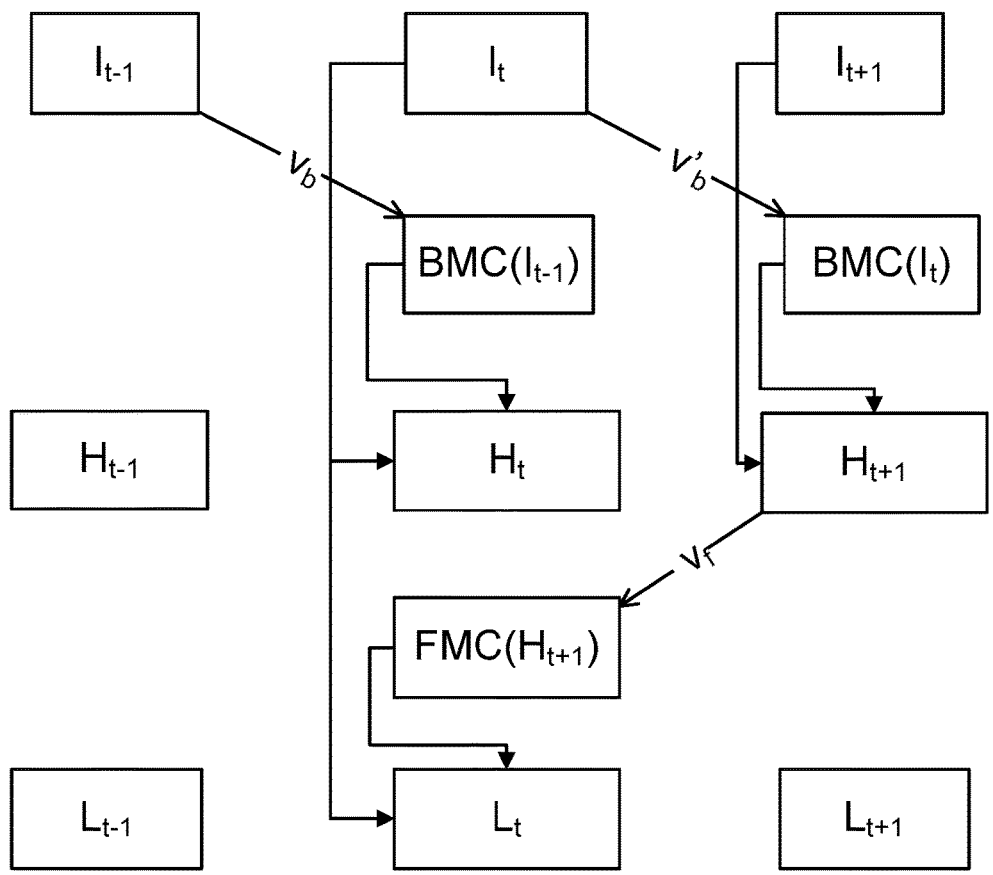
FIG. 3 illustrates a scheme of temporal filtering that can be used for obtaining a high pass temporal filtered current image $H_t$ and a low pass temporal filtered current image $L_t$, in the main embodiment of FIG. 2.

In a fourth step of the embodiment, still using the high pass temporal filtering module, a high pass temporal filtered following image $H_{t+1}$ is obtained using the same process as in the third step above through a comparison of the following image $I_{t+1}$ with a Backward Motion-Compensated image $BMC(I_t)$ (see FIG. 3). More precisely, the luminance $H_{t+1}(p)$ of each pixel p of this high pass temporal filtered following image $H_{t+1}$ is preferably calculated as follows in reference to the luminance $Y_{t+1}(p)$ of the pixel p in the following image $I_{t+1}$ and to the luminance $Y_t(p+v'_b)$ of the corresponding pixel $p+v'_b$ in the current image $I_t$:

$$H_{t+1}(p) = \frac{Y_{t+1}(p) - Y_t(p + v'_b)}{2}$$

Using the low pass temporal filtering module, low temporal frequencies of the current image $I_t$ are obtained in a fifth step by comparing the current original image $I_t$ with the high pass temporal filtered following image $H_{t+1}$ which is now Forward Motion Compensated (FMC) using, for each pixel p of this high pass temporal filtered following image, the forward motion vector $v_f$ of the pixel p of the following image $I_{t+1}$ obtained through the second preliminary step above. As depicted on FIG. 3, the result of this comparison is a low pass temporal filtered current image $L_t$.

More precisely, the luminance $L_t(p)$ of each pixel n of this low pass temporal filtered current image $L_t$ is preferably calculated as follows in reference to the luminance $Y_t(p)$ of the pixel p in the current image $I_t$ and to the luminance $H_{t+1}(p+v_f)$ of the corresponding pixel $p+v_f$ in the high pass temporal filtered following image $H_{t+1}$:

$$L_t(p) = 2 \times Y_t(p) - H_{t+1}(p+v_f)$$

Globally, these fourth and fifth steps depicted on FIG. 3 correspond to a low pass motion-compensated temporal filtering of the current image $I_t$. These steps are different from the low pass filtering in a spatial neighborhood of the pixel as disclosed in WO2015/096955, because such a low pass filtering corresponds to a low pass spatial filtering, instead of a temporal filtering.

Other way of low pass motion-compensated temporal filtering can be used instead of the fourth and fifth steps above. When luminance $Y_t(n)$ of colors are encoded into increasing levels of wavelet decomposition along a temporal axis as described above in reference to FIG. 4, the low pass temporal filtered current image $L_t$ will correspond to a low frequency subband of the wavelet decomposition of the current image $I_t$ along the temporal axis.

Using the expansion exponent map building module, in a sixth step of the embodiment, an expansion exponent map is built according to the following two substeps.

First, the luminance range of the pixel of the low pass temporal filtered current image $L_t$ obtained from the fourth and fifth steps above is readjusted in order to fit the quantization of the luminance channel encoding the colors, for instance based on 8 bits. It means that each value of luminance of the low pass temporal filtered current image $L_t$ is divided by 255.

Although the expansion exponent values corresponding to the readjusted value of luminance of the low pass temporal filtered current image $L_t$ indicate the per-pixel expansion exponents at a relative scale, these expansion exponent values need to be rescaled such that they conform to a set of constraints. Despite the increased abilities of HDR display devices that could be used to reproduce the HDR images provided by the inverse tone mapping method, the mean luminance in the expanded HDR image that is obtained by this method should preferably maintain to levels comparable to that of the original current LDR image $I_t$. At the same time, the expansion of luminance should take into account the peak luminance Dmax of the display device that will be used to reproduce the expanded HDR current image, so as to expand highlights appropriately. Therefore, through the second substep, a reshaped/rescaled pixel expansion exponent value $E_t(p)$ is for instance obtained for each pixel p of the current image $I_t$ through the following equation:

$$E_t(p) = \left(\alpha \frac{L_t(p)}{255} + 1 - \alpha\right) \frac{\log(D_{max})}{\log(\max(Y_t))}$$

where the parameter $\alpha$ can be used to control the overall behavior of the luminance expansion,
where $L_t(p)$ is the luminance of the pixel p in the low pass temporal filtered current image $L_t$ as computed in the fourth and fifth steps above,
where $\max(Y_t)$ is the maximum value of luminance $Y_t(n)$ over all pixels of the current original image $I_t$,
where the term $$\frac{\log(D_{max})}{\log(\max(Y_t))}$$

allows to have $Y_t(p)^{E(p)}=Dmax$ when $Y_t(p)=\max(Y_t)$.

The purpose of the parameter $\alpha$ is to control how 'flat' the luminance expansion is. It is a weight balancing between the spatially varying expansion and a constant exponent. Higher values for $\alpha$ mean that the luminance expansion is more local, therefore leading to a more extreme result, while lower values for $\alpha$ lead to an expansion closer to global. The value $\alpha=0.35$ has actually offered a good trade-off between highlight expansion and effective management of midtones.

At the end of this sixth step, all reshaped/rescaled pixel expansion exponent values $E_t(p)$ form then an expansion exponent map $E_t$ for the current original image $I_t$.

Using the luminance-enhancement map building module, in a seventh step of the embodiment, a luminance-enhancement map $Y_t^{enh}$ is built for the current image $I_t$. In this embodiment, the luminance-enhancement map is directly derived from the high pass temporal filtered current image $H_t$ that is obtained through the third step above. Each pixel luminance-enhancement value $Y_t^{enh}(p)$ is obtained through the following equation aimed at a renormalization of the luminance of the pixels of the high pass temporal filtered current image $H_t$:

$$Y_t^{enh}(p) = \left[\frac{H_t(p) + \text{abs}(\min H_t)}{\max H_t + \text{abs}(\min H_t)}\right]^c$$

where $\min H_t$ and $\max H_t$ corresponds respectively to the minimum value and to the maximum value of luminance over all pixels of the high pass temporal filtered current image $H_t$, where the operator "abs" means "absolute value", where the exponent parameter c controls the amount of detail enhancement brought by pixel luminance-enhancement values.

Larger values of the parameter c gradually increase the contrast of image edges. A value of c=2 is preferably used.

Pixel luminance-enhancement values $Y_t^{enh}(p)$ of the different pixels p form then a luminance-enhancement map $Y_t^{enh}$ of the current original image $I_t$, that, when applied to the expanded luminance values of the current image $I_t$, will enhance its details, because it is based on the extraction of high frequencies of luminance values of the current image $I_t$.

Using the inverse tone mapping module, in an eighth step of this embodiment, the luminance $Y_t(p)$ of each pixel p of the current original image $I_t$ is inverse tone mapped into an expanded luminance $Y_t^{exp}(p)$ obtained through the product:
- of the luminance of this pixel at the power of the expansion exponent value $E_t(p)$ of this pixel, extracted from the expansion exponent map $E_t$ of the current original image $I_t$, and
- of the pixel luminance-enhancement value $Y_t^{enh}(p)$ of this pixel, extracted from the luminance-enhancement map $Y_t^{enh}$ of the same current original image $I_t$.

It means that we have $Y_t^{exp}(p) = Y(p)^{E_t(p)} \cdot Y_t^{enh}(p)$.

An expanded-luminance current image is then obtained.

When expanding the luminance of a current image $I_t$ as described above, luminance and contrast changes can affect appearance of colors and saturation in this image. While expanding its luminance range, color information of this current image may be managed in a ninth optional step to preserve the artistic color intent of the image. Preferably, using the optional enhancement saturation module, saturations of colors are enhanced using the expansion exponent values as a guide. More specifically, the saturation of the color of each pixel is for instance enhanced by a factor equal to the expansion exponent value of this pixel. Saturation of the color of a pixel p is for instance enhanced by adjusting a Chroma value $C_t(p)$ of this pixel, computed as follows in a cylindrical version of the YUV space:

$$C_t(p) = \sqrt{U_t(p)^2 + V_t(p)^2}$$

and an adjusted Chroma value $C_t^{exp}(p)$ is computed as the product of expansion exponent $E_t(p)$ of this pixel p by the Chroma value $C_t(p)$ of this pixel, such that:

$$C_t^{exp}(p) = E_t(p) \cdot C_t(p)$$

Such a Chroma scaling which transforms $C_t(p)$ into $C_t^{exp}(p)$ is preferably limited to a factor of 1.5 to avoid over-saturating highlights, e.g. to avoid light explosions and bright lights.

With these values of expanded Chroma $C_t^{exp}(p)$ for each pixel of the current image $I_t$, new values of expanded chrominance $U_t^{exp}(p)$, $V_t^{exp}(p)$ are calculated, using a usual way of conversion from a cylindrical color space such as LCH here, toward a YUV space:

$$U_t^{exp}(p) = \cos[\theta_t(p)] \cdot C_t^{exp}(p)$$

$$V_t^{exp}(p) = \sin[(\theta_t(p)] \cdot C_t^{exp}(p)$$

where $\theta_t(p)$ is the hue of the pixel p in the current image $I_t$ computed from $U_t(p)$ and $V_t(p)$ as follows: $\theta_t(p) = \arctan[V_t(p), U_t(p)]$.

At the end of the eighth or ninth step, the $Y_t(p)$, $U_t(p)$, $V_t(p)$ coordinates of the color of each pixel of the current image $I_t$ are then expanded into new $Y_t^{exp}(p)$, $U_t^{exp}(p)$, $V_t^{exp}(p)$ coordinates representing, in the YUV color space, expanded colors of an inverse tone-mapped current image $I_t^{exp}$. If the ninth step above is not performed, $U_t^{exp}(p) = U_t(p)$ and $V_t^{exp}(p) = V_t(p)$.

In a final eleventh step of the embodiment (not shown on FIG. 2), the new $Y_t^{exp}(p)$, $U_t^{exp}(p)$, $V_t^{exp}(p)$ coordinates of colors of the inverse tone-mapped current image $I_t^{exp}$ are converted back in a manner known per se into corresponding new $R_t^{exp}(p)$, $G_t^{exp}(p)$, $B_t^{exp}(p)$ coordinates representing the same colors but in the RGB color space. If needed, these $R_t^{exp}(p)$, $G_t^{exp}(p)$, $B_t^{exp}(p)$ coordinates are delinearized such as to represent inverse tone-mapped colors in the color space in which colors were inputted at the first step above For each image of the sequence that is inputted in the image processing device, the same inverse tone-mapping process as described above is applied, leading to a sequence of HDR images. This sequence of HDR images can then be sent—for instance through an output of the image processing device—to an HDR display device having a peak luminance Dmax, in order to have this sequence reproduced with a high dynamic range.

ADVANTAGES

The expanded images that are obtained through the method according to the invention are as close as possible to what a HDR sequence of images of the same scene would look like. The obtained expanded content is of higher visual quality compared to the LDR input sequence, even in cases where only modest expansion can be applied. This luminance expansion method enhances bright image features, conveys the appearance of light sources and highlights to the viewer, while preserving midrange values. Depending on the luminance range of the display device used to reproduce these expanded images, dark values may be preserved or further compressed to enhance global contrast in the image.

The method according to the invention uses a low pass motion-compensated temporal filtering process to define expansion exponent values that are used to expand luminance of colors. This low pass filtering process smooths some details of the image. Advantageously, this removal of details is compensated by the extraction of high temporal frequencies used to obtain the luminance enhancement factor applied to the expanded luminance. In other words, the component $Y_t^{enh}(p)$ of the high pass motion-compensated temporal filtering of luminance values is performed such as to compensate at least partially the smoothing of details of the image that is caused by the component $E_t(p)$ of the low pass motion-compensated temporal filtering of luminance values.

From experimental results, it has been observed that:
maps of expansion exponent values obtained from low pass motion-compensated temporal filtering as described above can guide more accurately luminance expansion of colors while better respecting edges in images that maps of expansion exponent values obtained for instance from low pass spatial bilateral filtering, maps of luminance-enhancement values obtained from high pass motion-compensated temporal filtering as described above is able to selectively enhance edges related to visually attractive moving objects, while enhancing more slightly the other edges, as opposed to maps of luminance-enhancement values obtained from high pass spatial bilateral filtering which may enhance too many details that are potentially not relevant and may create halos when confronting to strong edges, potential temporal flickering due to inconsistent temporal changes of luminance values is highly reduced by using a temporally consistent motion compensated frames for expressing expansion and enhancement maps.

While the present invention is described with respect to a general embodiment, it is understood that the present invention is not limited to this embodiment. The present invention as claimed therefore includes variations from this embodiment.

The invention claimed is:

1. A method for inverse tone mapping at least one original current image ($I_t$) of a sequence of images, the colors of which are represented in a color space separating luminance from chrominance, comprising:
   building an expansion exponent map ($E_t$) from low pass motion-compensated temporal filtering of said original current image ($I_t$),
   building a luminance-enhancement map ($Y_t^{enh}$) from high pass motion-compensated temporal filtering of said original current image ($I_t$),
   inverse tone mapping the luminance ($Y_t(p)$) of each pixel (p) of said original current image ($I_t$) into an expanded luminance ($Y_t^{exp}(p)$) obtained through the product of the luminance ($Y_t(p)$) of said pixel at the power of an expansion exponent value ($E_t(p)$) obtained for the corresponding pixel (p) in said expansion exponent map ($E_t$) and of a luminance-enhancement value ($Y_t^{enh}(p)$) obtained for the corresponding pixel (p) in said luminance-enhancement map ($Y_t^{enh}$), and
   generating a corresponding expanded current image ($I_t^{exp}$) based on said expanded luminance ($Y_t^{exp}(p)$).

2. The method for inverse tone mapping according to claim 1 comprising enhancing saturation of colors of said at least one original image ($I_t$) by multiplying chroma ($C_t(p)$) of each pixel of said image by expansion exponent value ($E_t(p)$) obtained for this pixel (p) in said expansion exponent map ($E_t$).

3. The method for inverse tone mapping according to claim 1 wherein said high pass motion-compensated temporal filtering of said original current image ($I_t$) is obtained by a temporal decomposition of said current image ($I_t$) into at least one temporal high frequency band using wavelet filtering along a temporal axis, and wherein said low pass motion-compensated temporal filtering of said original current image ($I_t$) is obtained by the same temporal decomposition of said current image ($I_t$) into at least one temporal low frequency band using the same wavelet filtering along the temporal axis.

4. The method for inverse tone mapping according to claim 1 wherein said high pass motion-compensated temporal filtering of said original current image ($I_t$) is obtained based on a difference between said original current image ($I_t$) and an original preceding image ($I_{t-1}$) in said sequence which is backward motion compensated.

5. The method for inverse tone mapping according to claim 1 wherein said low pass motion-compensated temporal filtering of said original current image ($I_t$) is obtained:
   by high pass motion-compensated temporal filtering of an original following image ($I_{t+1}$) in said sequence, resulting in a high pass motion-compensated temporal filtered following image ($H_{t+1}$),
   then by computing a difference between said original current image ($I_t$) and said high pass motion-compensated temporal filtering following image ($H_{t+1}$) which is forward motion-compensated.

6. The method for inverse tone mapping according to claim 1 wherein building said expansion exponent map ($E_t$) takes into account a value of peak luminance ($D_{max}$) of a display device adapted to reproduce said expanded current image ($I_t^{exp}$).

7. The method for inverse tone mapping according to claim 1, wherein building said expansion exponent map ($E_t$) comprises reshaping said low pass motion-compensated temporal filtering of said current image ($I_t$) such that values of expanded luminance ($Y_t^{exp}(p)$) of said expanded current image ($I_t^{exp}$) that are obtained are redistributed such that the mean expanded luminance of said expanded current image ($I_t^{exp}$) is approximately equal to the mean luminance of said current image ($I_t$).

8. The method for inverse tone mapping according to claim 1 wherein building said luminance-enhancement map ($Y_t^{enh}$) comprises renormalizing luminances of high pass temporal filtered current image ($H_t$) obtained from said high pass motion-compensated temporal filtering of said current image ($I_t$) between a minimum value ($minH_t$) and a maximum value ($maxH_t$) of luminance over all pixels of the high pass temporal filtered current image ($H_t$).

9. An image processing device for inverse tone mapping at least one original current image ($I_t$) of a sequence of original images, the colors of which are represented in a color space separating luminance from chrominance, comprising at least one processor configured for:
   building an expansion exponent map ($E_t$) from low pass motion-compensated temporal filtering of said original current image ($I_t$),
   building a luminance-enhancement map ($Y_t^{enh}$) from high pass motion-compensated temporal filtering of said original current image ($I_t$),
   inverse tone mapping the luminance ($Y_t(p)$) of each pixel (p) of said original current image ($I_t$) into an expanded luminance ($Y_t^{exp}(p)$) obtained through the product of the luminance ($Y_t(p)$) of said pixel at the power of an expansion exponent value ($E_t(p)$) obtained for the corresponding pixel (p) in said expansion exponent map ($E_t$) and of a luminance-enhancement value ($Y_t^{enh}(p)$) obtained for the corresponding pixel (p) in said luminance-enhancement map ($Y_t^{enh}$),
   generating a corresponding expanded current image ($I_t^{exp}$) based on said expanded luminance ($Y_t^{exp}(p)$).

10. The image processing device according to claim 9 wherein said at least one processor is further configured to enhance saturation of colors of said at least one original current image ($I_t$) by multiplying chroma ($C_t(p)$) of each pixel of said image by expansion exponent value ($E_t(p)$) obtained for this pixel (p) in said expansion exponent map ($E_t$).

11. The image processing device according to claim 9, wherein said at least one processor is further configured to obtain said high pass motion-compensated temporal filtering of said original current image ($I_t$) by a temporal decomposition of said current image ($I_t$) into at least one temporal high frequency band using wavelet filtering along a temporal axis, and to obtain said low pass motion-compensated temporal filtering of said original current image ($I_t$) by the same temporal decomposition of said current image ($I_t$) into at least one temporal low frequency band using the same wavelet filtering along the temporal axis.

12. The image processing device according to claim 9, wherein said at least one processor is further configured to obtain said high pass motion-compensated temporal filtering of said original current image ($I_t$) based on a difference between said original current image ($I_t$) and an original preceding image ($I_{t-1}$) in said sequence which is backward motion compensated.

13. The image processing device according to claim 9, wherein said at least one processor is further configured to obtain said low pass motion-compensated temporal filtering of said original current image ($I_t$):
  by high pass motion-compensated temporal filtering of an original following image ($I_{t+1}$) in said sequence, resulting in a high pass motion-compensated temporal filtered following image ($H_{t+1}$),
  then by computing a difference between said original current image ($I_t$) and said high pass motion-compensated temporal filtering following image ($H_{t+1}$) which is forward motion-compensated.

14. The image processing device according to claim 9, wherein said at least one processor is further configured to take into account a value of peak luminance ($D_{max}$) of a display device adapted to reproduce said expanded current image ($I_t^{exp}$) when building said expansion exponent map ($E_t$).

15. The image processing device according to claim 9, wherein, for building said expansion exponent map ($E_t$), said at least one processor is further configured to reshape said low pass motion-compensated temporal filtering of said current image ($I_t$) such that values of expanded luminance ($Y_t^{exp}(p)$) of said expanded current image ($I_t^{exp}$) that are obtained, are redistributed such that the mean expanded luminance of said expanded current image ($I_t^{exp}$) is approximately equal to the mean luminance of said current image ($I_t$).

16. The image processing device according to claim 9, wherein, for building luminance-enhancement map ($Y_t^{enh}$), said at least one processor is further configured to renormalize luminances of high pass temporal filtered current image ($H_t$) obtained from said pass motion-compensated temporal filtering of said current image ($I_t$) between a minimum value ($minH_t$) and a maximum value ($maxH_t$) of luminance over all pixels of the high pass temporal filtered current image ($H_t$).

17. An electronic device incorporating the image processing device of claim 9.

18. The electronic device of claim 17 chosen from the group consisting of a TV set, a set-top-box, a gateway device, a cell phone and a tablet device.

* * * * *